US010978834B1

(12) United States Patent
Farruggella

(10) Patent No.: US 10,978,834 B1
(45) Date of Patent: Apr. 13, 2021

(54) AUXILIARY OUTLET SYSTEM

(71) Applicant: James Farruggella, Montgomery, NY (US)

(72) Inventor: James Farruggella, Montgomery, NY (US)

( * ) Notice: Subject to any disclaimer, the term of this patent is extended or adjusted under 35 U.S.C. 154(b) by 70 days.

(21) Appl. No.: 16/525,653

(22) Filed: Jul. 30, 2019

(51) Int. Cl.
*H01R 29/00* (2006.01)
*H01R 13/703* (2006.01)
*H02J 13/00* (2006.01)

(52) U.S. Cl.
CPC ......... *H01R 13/7038* (2013.01); *H01R 29/00* (2013.01); *H02J 13/0017* (2013.01)

(58) Field of Classification Search
None
See application file for complete search history.

(56) References Cited

U.S. PATENT DOCUMENTS

D276,150 S 10/1984 Marshall
5,036,214 A 7/1991 Zerillo
5,731,664 A * 3/1998 Posa ...................... H05B 47/19 315/194
5,895,985 A * 4/1999 Fischer ............... H02J 13/0017 307/116
6,114,812 A 9/2000 Lee
7,023,357 B2 4/2006 Fu
7,274,303 B2 9/2007 Dresti
7,375,445 B1 * 5/2008 Smith ................ H01R 13/7038 307/116
2006/0158040 A1 7/2006 McIntosh
2009/0322474 A1 * 12/2009 Park ................... G07C 9/00658 340/5.61
2014/0180486 A1 * 6/2014 Newman, Jr. ........... G06F 1/325 700/295
2015/0185751 A1 * 7/2015 Karc ......................... G05F 1/66 700/295
2016/0065004 A1 * 3/2016 Fritsch ..................... H01H 9/54 307/117
2017/0310109 A1 * 10/2017 Bollinger, Jr. ........... H01Q 1/38

* cited by examiner

*Primary Examiner* — Rexford N Barnie
*Assistant Examiner* — Terrence R Willoughby
(74) *Attorney, Agent, or Firm* — Kyle A. Fletcher, Esq.

(57) ABSTRACT

The auxiliary outlet system is an electrical socket that is configured for use with a national electric grid. The auxiliary outlet system is a port that distributes electricity from the national electric grid. The auxiliary outlet system comprises a transmitting outlet and one or more mirrored outlets. The transmitting outlet is configured to distribute electricity from the national electric grid. The one or more mirrored outlets are configured to distribute electricity from the national electric grid. The transmitting outlet broadcasts a radio frequency signal to each of the one or more mirrored outlets. The one or more mirrored outlets mirror the operation of the transmitting outlet. Specifically: a) each of the one or more mirrored outlets are enabled to distribute electricity when the transmitting outlet is enabled to distribute electricity; and, b) each of the one or more mirrored outlets are de-energized when the transmitting outlet is de-energized.

18 Claims, 5 Drawing Sheets

AUXILIARY OUTLET SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and electrically conductive connections, including details of structural connections incorporating built-in electrical components, more specifically, a structural connections wherein the built-in electrical component is a switch connected in series with the coupling connection. (H1R13/7038)

SUMMARY OF INVENTION

The auxiliary outlet system is an electrical device. The auxiliary outlet system is an electrical socket that is configured for use with a national electric grid. The auxiliary outlet system is a port that distributes electricity from the national electric grid. The auxiliary outlet system comprises a transmitting outlet and one or more mirrored outlets. The transmitting outlet is configured to distribute electricity from the national electric grid. The one or more mirrored outlets are configured to distribute electricity from the national electric grid. The transmitting outlet broadcasts a radio frequency signal to each of the one or more mirrored outlets.

The radio frequency signal may not be continuous, but may be a "pulse" or a "burst". The one or more mirrored outlets mirror the operation of the transmitting outlet. Specifically: a) each of the one or more mirrored outlets are enabled to distribute electricity when the transmitting outlet is enabled to distribute electricity; and, b) each of the one or more mirrored outlets are de-energized when the transmitting outlet de-energized.

These together with additional objects, features and advantages of the auxiliary outlet system will be readily apparent to those of ordinary skill in the art upon reading the following detailed description of the presently preferred, but nonetheless illustrative, embodiments when taken in conjunction with the accompanying drawings.

In this respect, before explaining the current embodiments of the auxiliary outlet system in detail, it is to be understood that the auxiliary outlet system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the auxiliary outlet system.

It is therefore important that the claims be regarded as including such equivalent construction insofar as they do not depart from the spirit and scope of the auxiliary outlet system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
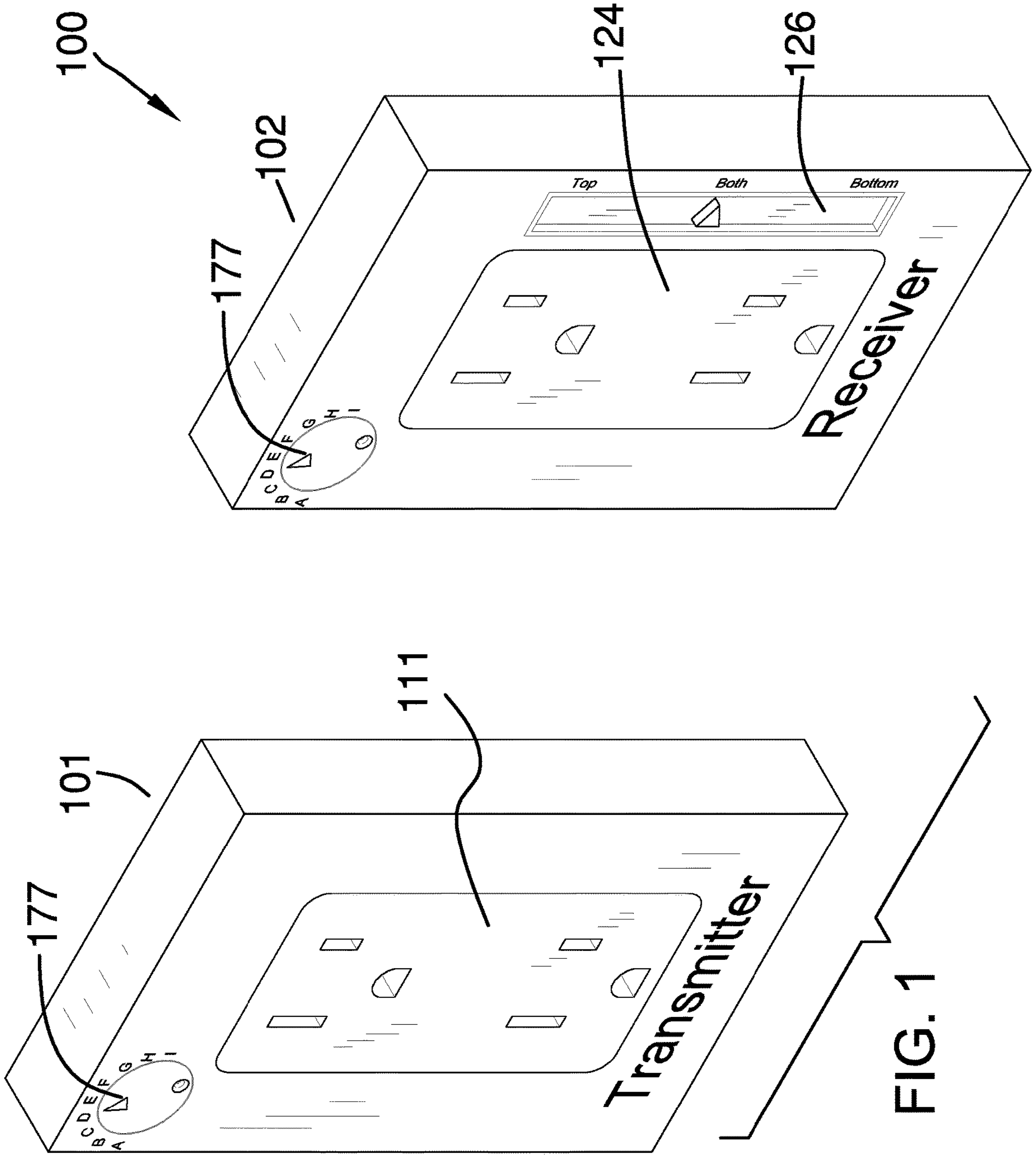
FIG. 1 is a perspective view of an embodiment of the disclosure.
Figure 2:
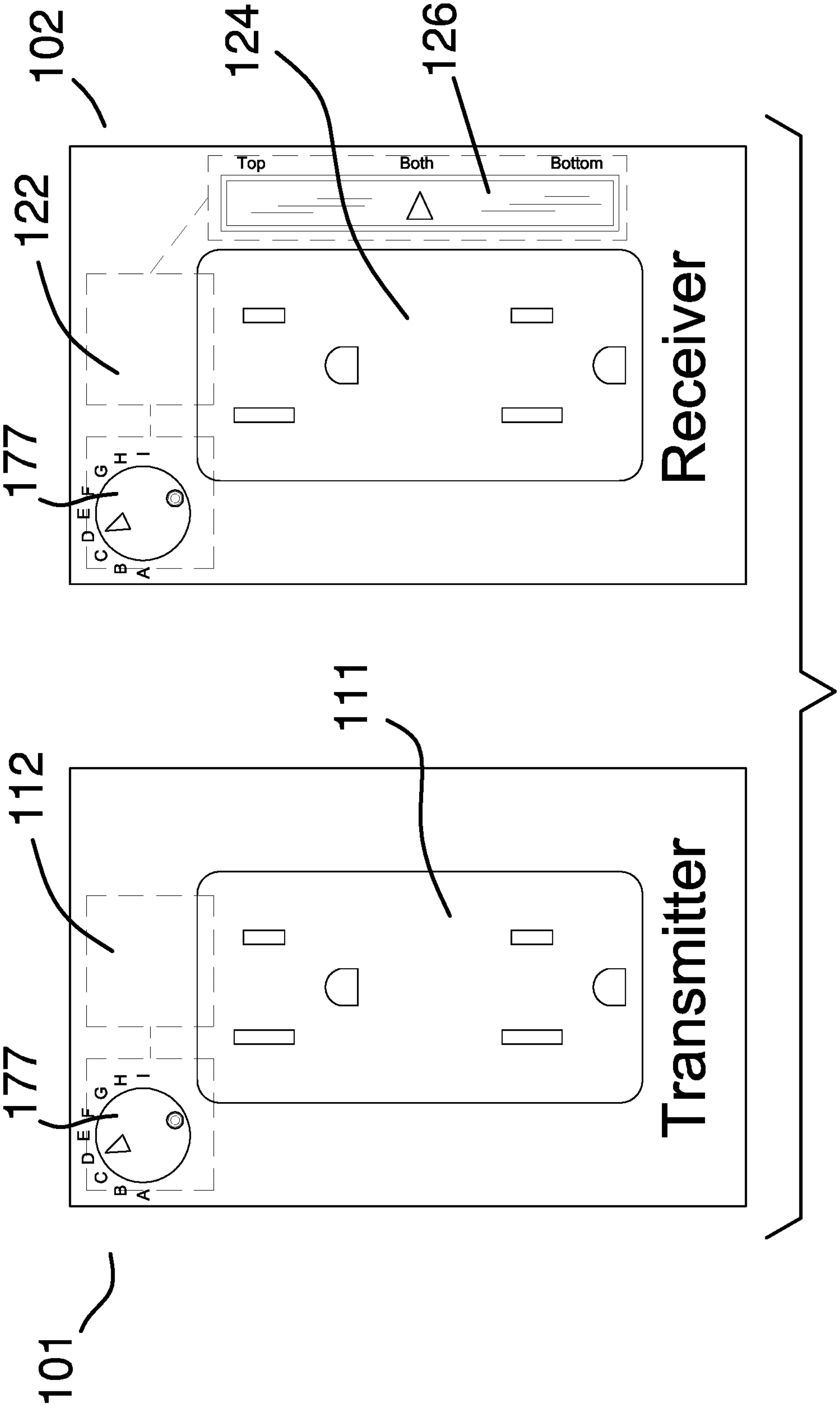
FIG. 2 is a front view of an embodiment of the disclosure.
Figure 3:
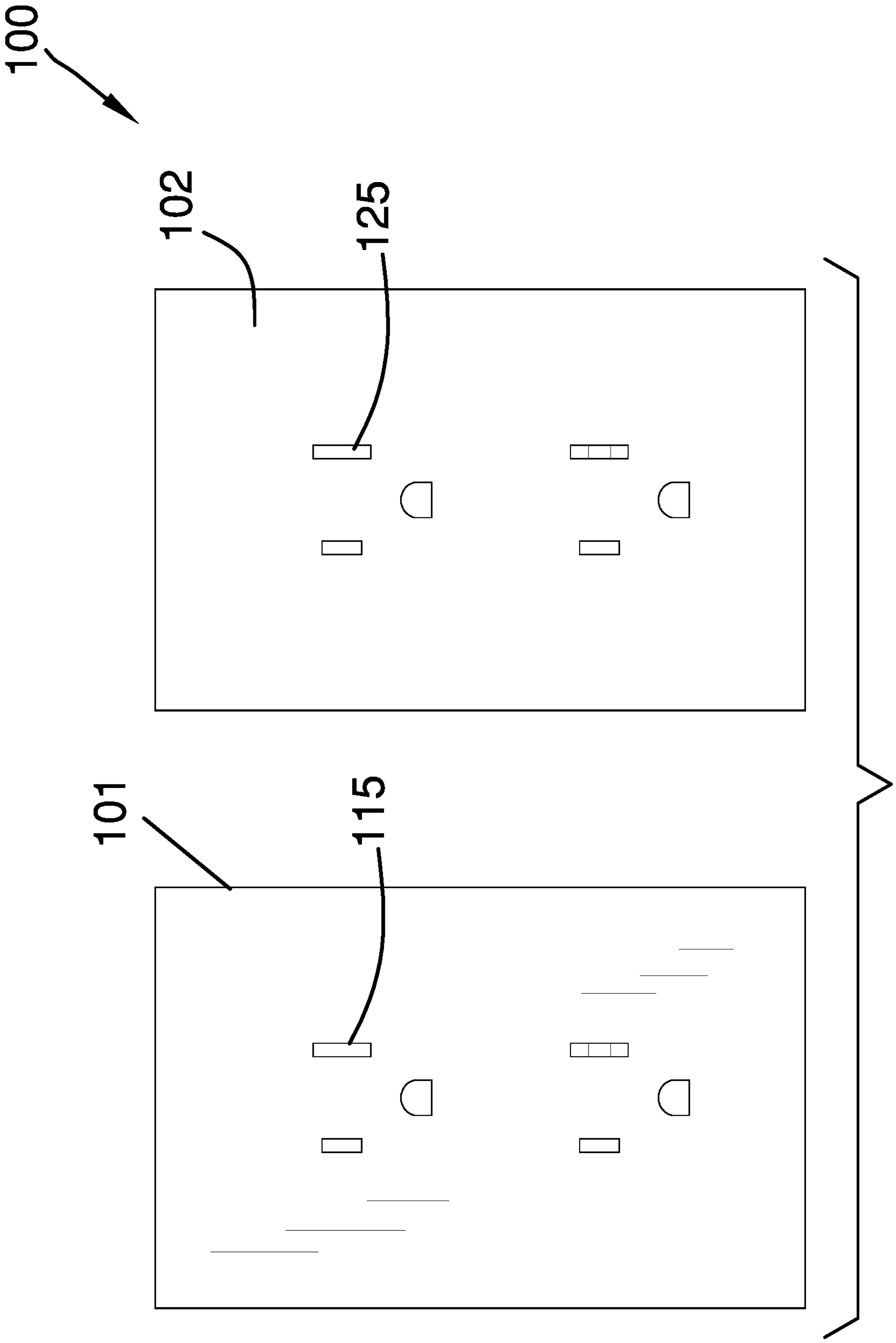
FIG. 3 is a rear view of an embodiment of the disclosure.
Figure 4:
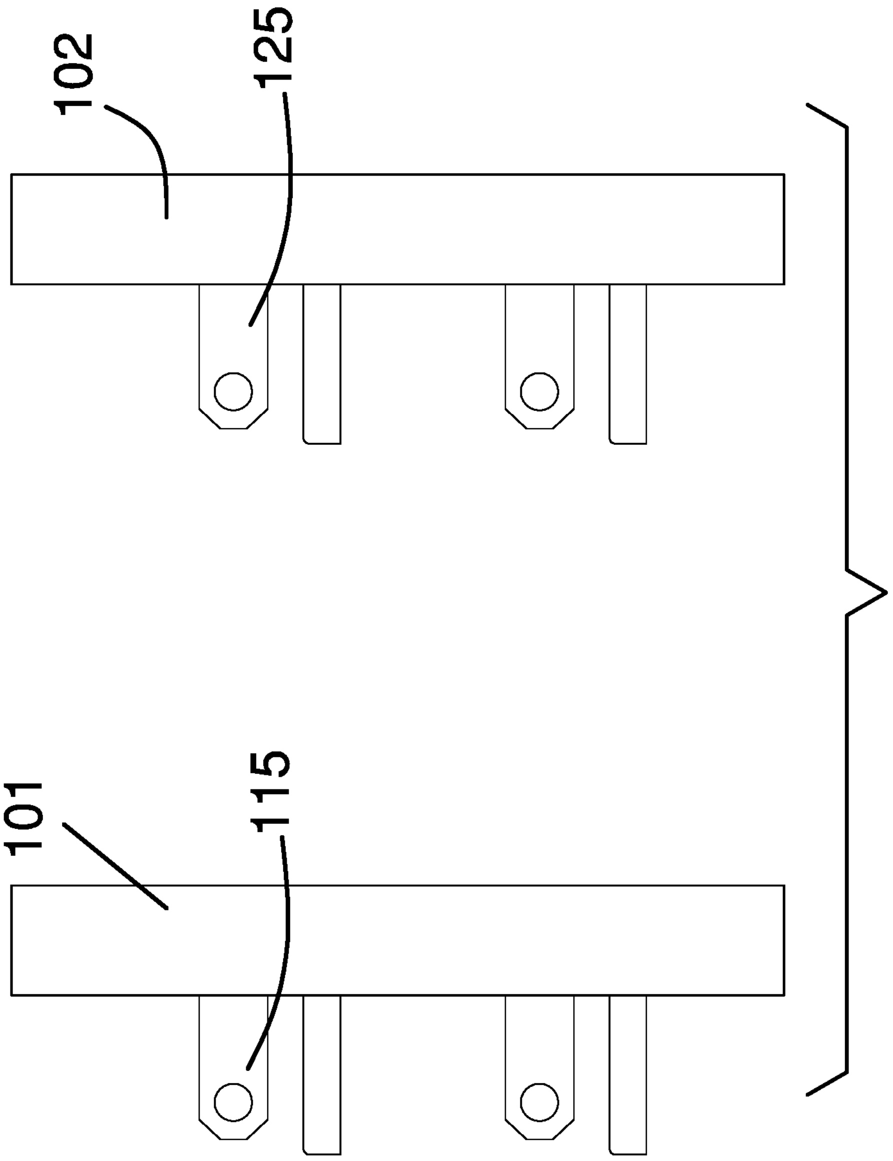
FIG. 4 is a side view of an embodiment of the disclosure.
Figure 5:
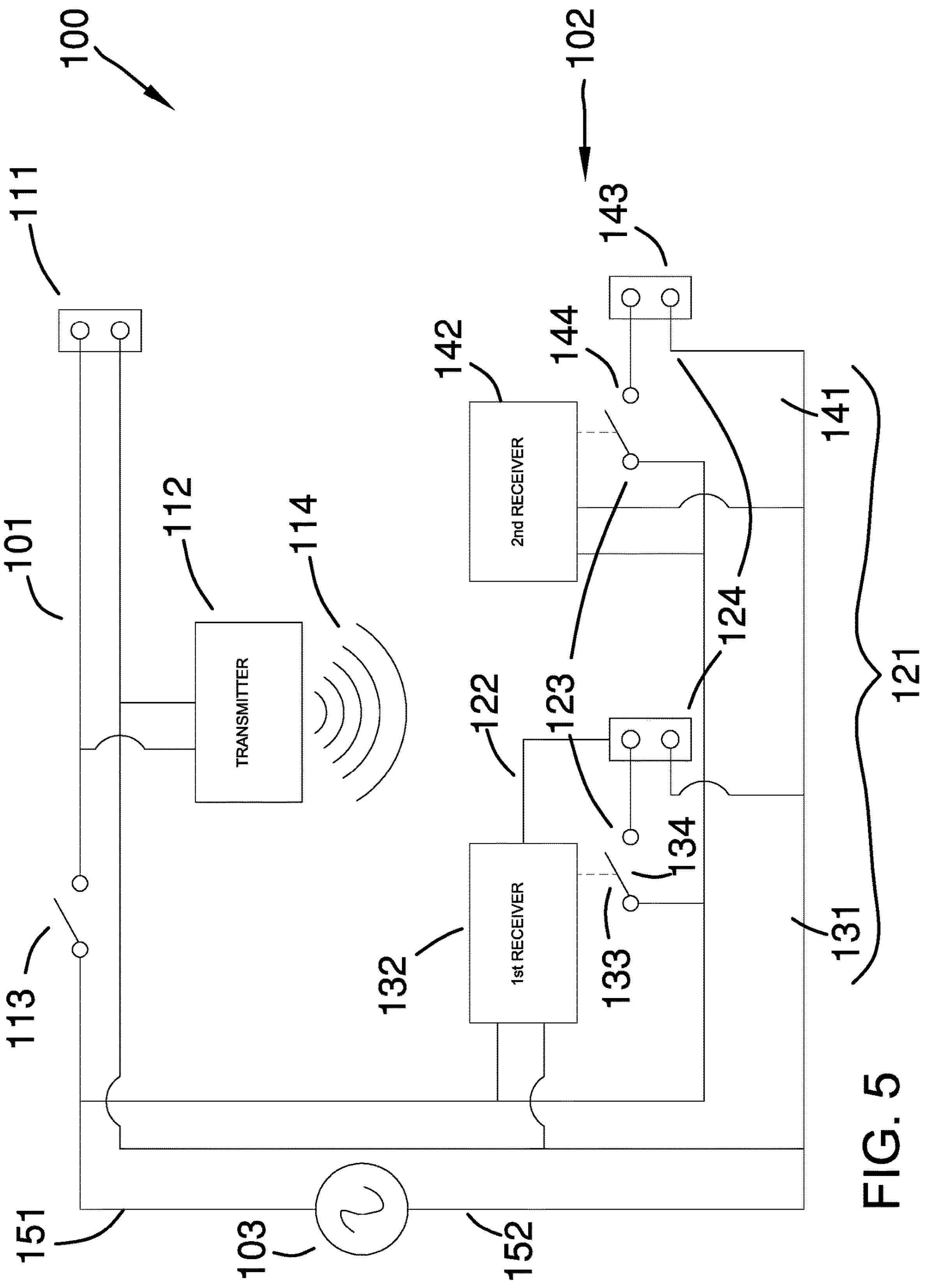
FIG. 5 is a schematic view of an embodiment of the disclosure.

Detailed reference will now be made to one or more potential embodiments of the disclosure, which are illustrated in FIGS. 1 through 5.

The auxiliary outlet system 100 (hereinafter invention) is an electrical device. The invention 100 is an electrical socket that is configured for use with a national electric grid 103. The invention 100 is a port that distributes electricity from the national electric grid 103. The invention 100 comprises a transmitting outlet 101 and one or more mirrored outlets 102. The transmitting outlet 101 is configured to distribute electricity from the national electric grid 103. The one or more mirrored outlets 102 are configured to distribute electricity from the national electric grid 103. The transmitting outlet 101 broadcasts a radio frequency signal to each of the one or more mirrored outlets 102. The one or more mirrored outlets 102 mirror the operation of the transmitting outlet 101. By mirrored is meant: a) each of the one or more mirrored outlets 102 are enabled to distribute electricity when the transmitting outlet 101 is enabled to distribute electricity (depending on selector switch setting 126); and, b) each of the one or more mirrored outlets 102 are de-energized when the transmitting outlet 101 de-energized by the maintained switch 113 (depending on selector switch setting 126).

This disclosure assumes that the transmitting outlet 101 is wired in series with a controlling maintained switch 113 that is proximal to the transmitting outlet 101. The maintained switch 113 creates what is commonly called a "switched outlet" commonly found in residences. The invention 100 allows for the conversion of an un-switched electrical outlet to a "switched outlet" configuration.

The national electric grid 103 is defined in greater detail elsewhere in this disclosure. The national electric grid 103 further comprises a hot lead 151 and a neutral lead 152. The hot lead 151 is defined elsewhere in this disclosure. The neutral lead 152 is defined elsewhere in this disclosure.

The transmitting outlet 101 is an electrical outlet. The transmitting outlet 101 is configured for use with a national electric grid 103. The transmitting outlet 101 distributes electricity received from the national electric grid 103 to a plug. The transmitting outlet 101 transmits a broadcast signal 114 that controls the operation of the one or more mirrored outlets 102. The transmitting outlet 101 electrically connects to the national electric grid 103 as a switched outlet. The transmitting outlet 101 comprises a NEMA socket 111, a transmitter 112, and a maintained switch 113. The transmitter 112 further comprises a broadcast signal 114.

The NEMA socket 111 is a NEMA 5-15 electrical socket. The NEMA socket 111 is an electrical termination that distributes electricity from the national electric grid 103 to a plug selected from the group consisting of a NEMA 1-15P electric plug and a NEMA 5-15P electric plug.

The transmitter 112 is an electrical device. The transmitter 112 draws electrical energy from the national electric grid 103. The transmitter 112 transmits a broadcast signal 114 to each of the one or more mirrored outlets 102 (depending on selector switch setting 126). The broadcast signal 114 transmitted by the transmitter 112 controls the operation of each of the one or more mirrored outlets 102. The broadcast signal 114 indicates to the one or more mirrored outlets 102 the operating state of the transmitting outlet 101 such that the one or more mirrored outlets 102 will mirror the operation of the transmitting outlet 101 (depending on selector switch setting 126).

The maintained switch 113 is an electrical switch commonly referred to as a maintained switch 113. The maintained switch 113 is wired in series with the transmitting outlet 101. The maintained switch 113 installs in the hot lead 151 of the national electric grid 103 such that the maintained switch 113 controls the flow of electricity into the NEMA socket 111. The maintained switch 113 installs in the hot lead 151 of the national electric grid 103 such that the maintained switch 113 controls the flow of electricity into the transmitter 112.

When the maintained switch 113 is actuated to a closed position, the NEMA socket 111 is enabled to distribute electricity from the national electric grid 103. When the maintained switch 113 is actuated to a closed position, the transmitter 112 transmits the broadcast signal 114 to the one or more mirrored outlets 102. When the maintained switch 113 is actuated to an open position, the NEMA socket 111 is inhibited from distributing electricity from the national electric grid 103. When the maintained switch 113 is actuated to the open position, the transmitter 112 becomes unpowered and discontinues the transmission of the broadcast signal 114 to the one or more mirrored outlets 102, or broadcasts a signal to one or more mirrored outlets to become unpowered (depending on selector switch setting 126), the top, bottom, or both outlets to become unpowered.

Each of the one or more mirrored outlets 102 is an electrical outlet. Each of the one or more mirrored outlets 102 is configured for use with the national electric grid 103. Each of the one or more mirrored outlets 102 distributes electricity received from the national electric grid 103 to a plug. The transmitting outlet 101 controls the operation of each of the one or more mirrored outlets 102.

Each of the one or more mirrored outlets 102 is mirrored to the operation of the transmitting outlet 101. By mirrored is meant that: a) each of the one or more mirrored outlets 102 is enabled to distribute electricity from the national electric grid 103 when the transmitting outlet 101 is enabled to distribute electricity from the national electric grid 103; and, b) each of the one or more mirrored outlets 102 is inhibited from distributing electricity from the national electric grid 103 when the transmitting outlet 101 disabled (depending on selector switch setting 126).

The one or more mirrored outlets 102 comprises a collection of individual mirrored outlet NEMA outlets 121. The individual mirrored outlet NEMA outlet 121 is an electrical outlet. The individual mirrored outlet NEMA outlet 121 is configured for use with the national electric grid 103. The individual mirrored outlet NEMA outlet 121 distributes electricity received from the national electric grid 103 to a plug selected from the group consisting of a NEMA 1-15P electric plug and a NEMA 5-15P electric plug. The broadcast signal 114 controls the operation of the individual mirrored outlet NEMA outlet 121. The individual mirrored outlet NEMA outlet 121 comprises an individual mirrored outlet receiver 122, an individual mirrored outlet relay 123, and an individual mirrored outlet set of one or more NEMA sockets 124.

The individual mirrored outlet receiver 122 is an electrical device. The individual mirrored outlet receiver 122 draws electrical energy from the national electric grid 103. The individual mirrored outlet receiver 122 operates continuously so long as the national electric grid 103 is generating electrical power. The individual mirrored outlet receiver 122 is configured to receive the broadcast signal 114 from the transmitter 112 of the transmitting outlet 101. The individual mirrored outlet receiver 122 controls the operation of the individual mirrored outlet relay 123 (depending on selector switch setting 126).

Specifically, the individual mirrored outlet receiver 122 actuates the individual mirrored outlet relay 123 to a closed position (depending on selector switch setting 126) when the individual mirrored outlet receiver 122 detects the broadcast signal 114 transmitted by the transmitter 112 of the NEMA socket 111. The individual mirrored outlet receiver 122 actuates the individual mirrored outlet relay 123 to an open position (depending on selector switch setting 126) when the individual mirrored outlet receiver 122 fails to detect the broadcast signal 114 transmitted by the transmitter 112 of the NEMA socket 111 or receive a signal from transmitter 112 to open the receiver depending on the selector switch setting 126.

The individual mirrored outlet relay 123 is a relay. The individual mirrored outlet relay 123 electrically connects in series with the individual mirrored outlet set of one or more NEMA sockets 124 such that the individual mirrored outlet relay controls the flow of electricity into the individual mirrored outlet set of one or more NEMA sockets 124 (depending on selector switch setting 126). The individual mirrored outlet relay 123 installs in the hot lead 151 of the national electric grid 103.

Each of the individual mirrored outlet set of one or more NEMA sockets 124 is a NEMA 5-15 electrical socket. Each of the individual mirrored outlet set of one or more NEMA sockets 124 is an electrical termination that distributes electricity from the national electric grid 103 to a plug selected from the group consisting of a NEMA 1-15P electric plug and a NEMA 5-15P electric plug.

In the first potential embodiment of the disclosure, the one or more mirrored outlets 102 comprises a first mirrored outlet 131 and a second mirrored outlet 141.

The first mirrored outlet 131 comprises a first mirrored outlet 131 receiver 132, a first mirrored outlet 131 relay 133, and a first mirrored outlet 131 set of one or more NEMA sockets 134. The first mirrored outlet 131 is a first individual mirrored outlet NEMA outlet 121 selected from the one or more mirrored outlets 102. The first mirrored outlet 131 receiver 132 performs the functions of the individual mirrored outlet receiver 122 for the first mirrored outlet 131. The first mirrored outlet 131 relay 133 performs the functions of the individual mirrored outlet relay 123 for the first mirrored outlet 131. The first mirrored outlet 131 set of one or more NEMA sockets 134 performs the functions of the individual mirrored outlet set of one or more NEMA sockets 124 for the first mirrored outlet 131 as each can function individually depending on their respective selector switch setting 126.

The second mirrored outlet 141 comprises a second mirrored outlet 141 receiver 142, a second mirrored outlet 141 relay 143, and a second mirrored outlet 141 set of one or more NEMA sockets 144. The second mirrored outlet 141 is a second individual mirrored outlet NEMA outlet 121 selected from the one or more mirrored outlets 102. The second mirrored outlet 141 receiver 142 performs the functions of the individual mirrored outlet receiver 122 for the second mirrored outlet 141. The second mirrored outlet 141 relay 143 performs the functions of the individual mirrored outlet relay 123 for the second mirrored outlet 141. The second mirrored outlet 141 set of one or more NEMA sockets 144 performs the functions of the individual mirrored outlet set of one or more NEMA sockets 124 for the second mirrored outlet 141 as each can function individually depending on their respective selector switch setting 126.

In a second potential embodiment of the disclosure, the transmitting outlet 101 further comprises a first plurality of NEMA 5-15P plugs 115. The individual mirrored outlet NEMA outlet 121 further comprises a second plurality of NEMA 5-15P plugs 125.

The first plurality of NEMA 5-15P plugs 115 comprises two NEMA 5-15P electric plugs that are plugged into an existing switched electrical outlet. The first plurality of NEMA 5-15P plugs 115 forms the electrical connection of the transmitting outlet 101 to the national electric grid 103. The second plurality of NEMA 5-15P plugs 125 comprises two NEMA 5-15P electric plugs that are plugged into an existing switched electrical outlet. The second plurality of NEMA 5-15P plugs 125 forms the electrical connection of the individual mirrored outlet NEMA outlet 121 to the national electric grid 103.

In the first potential embodiment of the disclosure, the transmitter 112, the individual mirrored outlet receiver 122, and the individual mirrored outlet relay 123 are provisioned as a commercially available 433 MHz remote control switch and transmitter.

In the second potential embodiment of the disclosure, the transmitter 112, the individual mirrored outlet receiver 122, and the individual mirrored outlet relay 123 are provisioned as a commercially available 433 MHz remote control switch and transmitter.

Frequency selector dial 177 is the component that is responsible for mirroring or pairing up the outlets. It shall be hereby noted that the term mirror is impliedly being used herein. The frequency selector dial 177 is wired to the transmitter 112 and the receivers 122, 142 in order to provide connectivity. The frequency selector dial 177 provides greater versatility to the invention 100.

The following definitions were used in this disclosure:

Broadcast: As used in this disclosure, a broadcast refers to a radio frequency transmission intended to be received by a plurality of receivers.

Hot Lead and Neutral Lead: As used in this disclosure, a hot lead is the source of the electric current that is provided by a voltage source. A neutral lead is the return for the electric current that is provisioned through the hot lead back to the voltage source.

Maintained Switch: A used in this disclosure, a maintained switch is a switch that maintains the position that was set in the most recent switch actuation. A maintained switch works in an opposite manner to a momentary switch.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid sells electrical power for use by an electrical load. The national electric grid invoices for electrical power based on the total energy consumed by the electrical load. The national electric grid measures the energy consumption of an electrical load with an electrical meter.

NEMA: As used in this disclosure, NEMA is an acronym for National Electric Manufacturers Association. NEMA is a manufacturer's association known for publishing widely accepted technical standards regarding the performance of electrical power distribution equipment.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMA 5-15 electrical socket comprises a plurality of electric ports from which electric power is drawn. The position of each of the plurality of electric ports is placed in a standardized position. The typical NEMA 5-15 electrical socket further comprises a plate hole which is a standardized hole located in a standardized position within the NEMA 5-15 electrical socket that that is designed to receive a bolt that is used to attach a faceplate to the NEMA 5-15 electrical socket. The NEMA 5-15 electrical socket is also commonly referred to as an electrical outlet.

NEMA 1-15P Electrical Plug: As used in this disclosure, the NEMA 1-15P Electrical Plug is a plug that is designed to be inserted into a NEMA 5-15 Electrical Socket for the purpose of delivering electrical power to electrical devices. The NEMA 1-15P Electrical Plug is a 2 blade plug that is commonly found within residential and office environments within the United States.

NEMA 5-15P Electrical Plug: As used in this disclosure, the NEMA 5-15P Electrical Plug is a plug that is designed to be inserted into a NEMA 5-15 Electrical Socket for the purpose of delivering electrical power to electrical devices.

The NEMA 5-15P Electrical Plug is a 3 blade plug that is commonly found within residential and office environments within the United States.

Outlet: As used in this disclosure, an outlet is a device placed in the electrical wiring system of a building where electrical current can be taken to run electrical devices. In this disclosure, an outlet is a socket adapted to receive a plug.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Receiver: As used in this disclosure, a receiver is a device that is used to receive and demodulate electromagnetic radiation such as radio signals.

Receptacle: As used in this disclosure, a receptacle is an electrical device that contains two individual outlets.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Remote Control: As used in this disclosure, remote control means the establishment of control of a device from a distance. Remote control is generally accomplished through the use of an electrical device that generates electrically based control signals that are transmitted via radio frequencies or other means to the device.

Socket: As used in this disclosure, a socket is an electrical device that 1) forms an opening or a cavity that acts as a receptacle for an inserted object; and 2) is designed to receive or transfer electricity to or from the object inserted in the socket.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Transmitter: As used in this disclosure, a transmitter is a device that is used to generate and transmit electromagnetic radiation such as radio signals.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An auxiliary outlet system comprising a transmitting outlet and one or more mirrored outlets;

wherein the transmitting outlet broadcasts a radio frequency signal to each of the one or more mirrored outlets;

wherein the auxiliary outlet system is an electrical socket;

wherein the auxiliary outlet system is configured for use with a national electric grid;

wherein the auxiliary outlet system distributes electricity from the national electric grid;

wherein the national electric grid further comprises a hot lead and a neutral lead;

wherein the one or more mirrored outlets comprises a first mirrored outlet and a second mirrored outlet;

wherein the first mirrored outlet is a first individual mirrored outlet NEMA outlet selected from the one or more mirrored outlets;

wherein the second mirrored outlet is a second individual mirrored outlet NEMA outlet selected from the one or more mirrored outlets;

wherein the first mirrored outlet comprises a first mirrored outlet receiver, a first mirrored outlet relay, and a first mirrored outlet set of one or more NEMA sockets;

wherein the first mirrored outlet receiver performs the functions of the individual mirrored outlet receiver for the first mirrored outlet;

wherein the first mirrored outlet relay performs the functions of the individual mirrored outlet relay for the first mirrored outlet;

wherein the first mirrored outlet set of one or more NEMA sockets performs the functions of the individual mirrored outlet set of one or more NEMA sockets for the first mirrored outlet;

wherein the second mirrored outlet comprises a second mirrored outlet receiver, a second mirrored outlet relay, and a second mirrored outlet set of one or more NEMA sockets;

wherein the second mirrored outlet receiver performs the functions of the individual mirrored outlet receiver for the second mirrored outlet;

wherein the second mirrored outlet relay performs the functions of the individual mirrored outlet relay for the second mirrored outlet;

wherein the second mirrored outlet set of one or more NEMA sockets performs the functions of the individual mirrored outlet set of one or more NEMA sockets for the second mirrored outlet;

wherein a frequency selector dial is wired to the transmitter and the first mirrored outlet receiver, and the second mirrored outlet receiver in order to provide connectivity.

2. The auxiliary outlet system according to claim 1 wherein the transmitting outlet distributes electricity from the national electric grid;

wherein the one or more mirrored outlets distribute electricity from the national electric grid;

wherein the one or more mirrored outlets mirror the operation of the transmitting outlet.

3. The auxiliary outlet system according to claim 2 wherein the transmitting outlet is an electrical outlet;

wherein the transmitting outlet is configured for use with a national electric grid;

wherein the transmitting outlet distributes electricity received from the national electric grid;

wherein the transmitting outlet electrically connects to the national electric grid as a switched outlet;

wherein the transmitter further comprises a broadcast signal;

wherein the transmitting outlet transmits the broadcast signal.

4. The auxiliary outlet system according to claim 3 wherein each of the one or more mirrored outlets is an electrical outlet;

wherein each of the one or more mirrored outlets is configured for use with the national electric grid;

wherein each of the one or more mirrored outlets distributes electricity received from the national electric grid to electrical devices;

wherein the broadcast signal controls the operation of the one or more mirrored outlets.

5. The auxiliary outlet system according to claim 4 wherein each of the one or more mirrored outlets is mirrored to the operation of the transmitting outlet;

wherein by mirrored is meant that: a) each of the one or more mirrored outlets is enabled to distribute electricity from the national electric grid when the transmitting outlet is enabled to distribute electricity from the national electric grid; and, b) each of the one or more mirrored outlets is inhibited from distributing electricity from the national electric grid when the transmitting outlet disabled.

6. The auxiliary outlet system according to claim 5 wherein the transmitting outlet comprises a National Electric Manufacturers Association Socket (hereinafter NEMA socket, a transmitter, and a maintained switch;

wherein the NEMA socket is a NEMA 5-15 electrical socket;

wherein the transmitter is an electrical device;

wherein the transmitter draws electrical energy from the national electric grid;

wherein the maintained switch is wired in series with the transmitting outlet.

7. The auxiliary outlet system according to claim 6 wherein the transmitter transmits the broadcast signal to each of the one or more mirrored outlets;

wherein the broadcast signal indicates to the one or more mirrored outlets the operating state of the transmitting outlet such that the one or more mirrored outlets will mirror the operation of the transmitting outlet.

8. The auxiliary outlet system according to claim 7 wherein the maintained switch installs in the hot lead of the national electric grid such that the maintained switch controls the flow of electricity into the NEMA socket.

9. The auxiliary outlet system according to claim 8 wherein the maintained switch installs in the hot lead of the national electric grid such that the maintained switch controls the flow of electricity into the transmitter;

wherein when the maintained switch is actuated to a closed position, the NEMA socket is enabled to distribute electricity from the national electric grid;

wherein when the maintained switch is actuated to a closed position, the transmitter transmits the broadcast signal to the one or more mirrored outlets;

wherein when the maintained switch is actuated to an open position, the NEMA socket is inhibited from distributing electricity from the national electric grid;

wherein when the maintained switch is actuated to the open position, the transmitter becomes unpowered and discontinues the transmission of the broadcast signal to the one or more mirrored outlets.

10. The auxiliary outlet system according to claim 9 wherein the one or more mirrored outlets comprises a collection of individual mirrored outlet NEMA outlets.

11. The auxiliary outlet system according to claim 10 wherein the individual mirrored outlet NEMA outlet is an electrical outlet;

wherein the individual mirrored outlet NEMA outlet is configured for use with the national electric grid;

wherein the individual mirrored outlet NEMA outlet distributes electricity received from the national electric grid.

12. The auxiliary outlet system according to claim 11 wherein the broadcast signal controls the operation of the individual mirrored outlet NEMA outlet.

13. The auxiliary outlet system according to claim 12 wherein the individual mirrored outlet NEMA outlet comprises an individual mirrored outlet receiver, an individual mirrored outlet relay, and an individual mirrored outlet set of one or more NEMA sockets;

wherein the individual mirrored outlet receiver is an electrical device;

wherein the individual mirrored outlet receiver is configured to receive the broadcast signal from the transmitter of the transmitting outlet;

wherein the individual mirrored outlet receiver controls the operation of the individual mirrored outlet relay;

wherein the individual mirrored outlet relay is a relay;

wherein the individual mirrored outlet relay electrically connects in series with the individual mirrored outlet set of one or more NEMA sockets such that the individual mirrored outlet relay controls the flow of electricity into the individual mirrored outlet set of one or more NEMA sockets;

wherein each of the individual mirrored outlet set of one or more NEMA sockets is a NEMA 5-15 electrical socket;

wherein each of the individual mirrored outlet set of one or more NEMA sockets is an electrical termination that distributes electricity from the national electric grid.

14. The auxiliary outlet system according to claim 13 wherein the individual mirrored outlet receiver draws electrical energy from the national electric grid;

wherein the individual mirrored outlet receiver operates continuously.

15. The auxiliary outlet system according to claim 14 wherein the individual mirrored outlet receiver actuates the individual mirrored outlet relay to a closed position when the individual mirrored outlet receiver detects the broadcast signal transmitted by the transmitter of the NEMA socket;

wherein the individual mirrored outlet receiver actuates the individual mirrored outlet relay to an open position when the individual mirrored outlet receiver fails to detect the broadcast signal transmitted by the transmitter of the NEMA socket.

16. The auxiliary outlet system according to claim 15 wherein the individual mirrored outlet relay installs in the hot lead of the national electric grid.

17. The auxiliary outlet system according to claim 16 wherein the transmitting outlet further comprises a first plurality of NEMA 5-15P plugs;

wherein the individual mirrored outlet NEMA outlet further comprises a second plurality of NEMA 5-15P plugs;

wherein the first plurality of NEMA 5-15P plugs forms the electrical connection of the transmitting outlet to the national electric grid;

wherein the second plurality of NEMA 5-15P plugs forms the electrical connection of the individual mirrored outlet NEMA outlet to the national electric grid.

18. The auxiliary outlet system according to claim 17 wherein the first plurality of NEMA 5-15P plugs comprises two NEMA 5-15P electric plugs that are plugged into an existing switched electrical outlet;

wherein the second plurality of NEMA 5-15P plugs comprises two NEMA 5-15P electric plugs that are plugged into an existing switched electrical outlet.

* * * * *